United States Patent
Sha et al.

(10) Patent No.: US 12,185,367 B2
(45) Date of Patent: Dec. 31, 2024

(54) SYSTEMS AND METHODS FOR PRACH RESOURCE CONFIGURATION

(71) Applicant: ZTE CORPORATION, Guangdong (CN)

(72) Inventors: Xiubin Sha, Shenzhen (CN); Bo Dai, Shenzhen (CN); Nan Zhang, Shenzhen (CN); Ting Lu, Shenzhen (CN); Li Niu, Shenzhen (CN); Xu Liu, Shenzhen (CN); Jie Tan, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 320 days.

(21) Appl. No.: 17/850,662

(22) Filed: Jun. 27, 2022

(65) Prior Publication Data
US 2022/0338245 A1  Oct. 20, 2022

Related U.S. Application Data

(63) Continuation of application No. PCT/CN2020/107529, filed on Aug. 6, 2020.

(51) Int. Cl.
*H04W 74/00* (2009.01)
*H04W 74/0833* (2024.01)

(52) U.S. Cl.
CPC ..... *H04W 74/002* (2013.01); *H04W 74/0833* (2013.01)

(58) Field of Classification Search
None
See application file for complete search history.

(56) References Cited

U.S. PATENT DOCUMENTS

| | | | |
|---|---|---|---|
| 10,694,444 B2 | 6/2020 | Shaheen | |
| 2017/0231011 A1* | 8/2017 | Park | H04W 72/0446 |
| 2018/0324716 A1* | 11/2018 | Jeon | H04W 74/0833 |
| 2018/0359790 A1* | 12/2018 | Ingale | H04W 72/51 |
| 2019/0110234 A1* | 4/2019 | Peisa | H04W 36/085 |
| 2021/0014899 A1* | 1/2021 | Shih | H04B 17/318 |
| 2021/0127424 A1* | 4/2021 | Yasukawa | H04W 16/28 |
| 2022/0279572 A1* | 9/2022 | Lei | H04L 5/001 |

FOREIGN PATENT DOCUMENTS

| | | |
|---|---|---|
| CN | 110476367 A | 11/2019 |
| WO | WO-2018/208219 A1 | 11/2018 |

OTHER PUBLICATIONS

Extended European Search Report for EP Appl. No. 20948049.0, dated Oct. 21, 2022 (8 pages).
CMCC: "RACH in Gradual UE-Specific (GUS) initial access" 3GPP TSG RAN WG1 NR Ad-Hoc Meeting; R1-1700431; Jan. 20, 2017; Spokane, USA (4 pages).
International Search Report and Written Opinion for PCT Appl. No. PCT/CN2020/107529 mailed Mar. 30, 2021 (9 pages).

* cited by examiner

*Primary Examiner* — Jamaal Henson
(74) *Attorney, Agent, or Firm* — Foley & Lardner LLP

(57) ABSTRACT

A system and method for transmission indications are disclosed herein. In one embodiment, the system and method are configured to send, by a wireless communication node to a wireless communication device, Physical Random Access Channel (PRACH) parameter configuration, wherein the PRACH parameter configuration indicates mapping between a plurality of PRACH resources and a plurality of cell beams, and receive, by the wireless communication node from the wireless communication device, a preamble.

18 Claims, 13 Drawing Sheets

SYSTEMS AND METHODS FOR PRACH RESOURCE CONFIGURATION

CROSS-REFERENCE TO RELATED APPLICATION

This application claims the benefit of priority under 35 U.S.C. § 120 as a continuation of PCT Patent Application No. PCT/CN2020/107529, filed on Aug. 6, 2020, the disclosure of which is incorporated herein by reference in its entirety.

TECHNICAL FIELD

The disclosure relates generally to wireless communications and, more particularly, to systems and methods for PRACH resource configuration.

BACKGROUND

In areas where there is weak terrestrial network service or no terrestrial network service, a non-terrestrial network ("NTN") network may be employed to support connectivity of massive Internet of Things ("IoT") devices and/or Enhanced Machine-Type Communication (eMTC). NTNs such as Geostationary Earth Orbit ("GEO") satellites or Low Earth Orbit ("LEO") satellites can provide continental local or regional services. However, special considerations must be made when using NTN networks. Generally, one satellite may be responsible for supporting communication in a very large area. Further, there is usually one IoT cell that supports communication with one satellite.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one embodiment, a method performed by a wireless communication node includes sending, by a wireless communication node to a wireless communication device, Physical Random Access Channel (PRACH) parameter configuration, wherein the PRACH parameter configuration indicates mapping between a plurality of PRACH resources and a plurality of cell beams; receiving, by the wireless communication node from the wireless communication device, a preamble; identifying, by the wireless communication node, one of the plurality of PRACH resources that corresponds to the received preamble; and determining, by the wireless communication node, based on the mapping, an index of one of the plurality of cell beams that the wireless communication device selects. Wherein "cell beam" may be referred to as "cell sector," "cell area," or "synchronization signal block (SSB) beam." The cell beam may include at least one of primary synchronization signal (PSS) block beam and/or secondary synchronization signal (SSS) block beam, etc., which may be used to split the cell PSS/SSS/MIB/and/or SIB1 transmitting area into a plurality of sub-areas. Each sub-area may have similar RF propagation delay, similar channel propagation characteristics, similar antenna characteristics, similar spatial code characteristics, etc. One sub-area corresponds to a physical random access channel (PRACH) resource set, and based on a PRACH resource that the UE selects, the eNB (e.g., the RF of the eNB) can decide the sub-area that the UE selects (e.g., camps on).

In another embodiment, a method performed by a wireless communication device includes receiving, by a wireless communication device from a wireless communication node, Physical Random Access Channel (PRACH) parameter configuration, wherein the PRACH parameter configuration indicates mapping between a plurality of PRACH resources and a plurality of cell beams; selecting, by the wireless communication device, an index of one of the plurality of cell beams; and transmitting, by the wireless communication device to the wireless communication node, a preamble using one of the plurality of PRACH resources that corresponds to the index of the selected cell beam.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

1. Mobile Communication Technology and Environment

Figure 1:
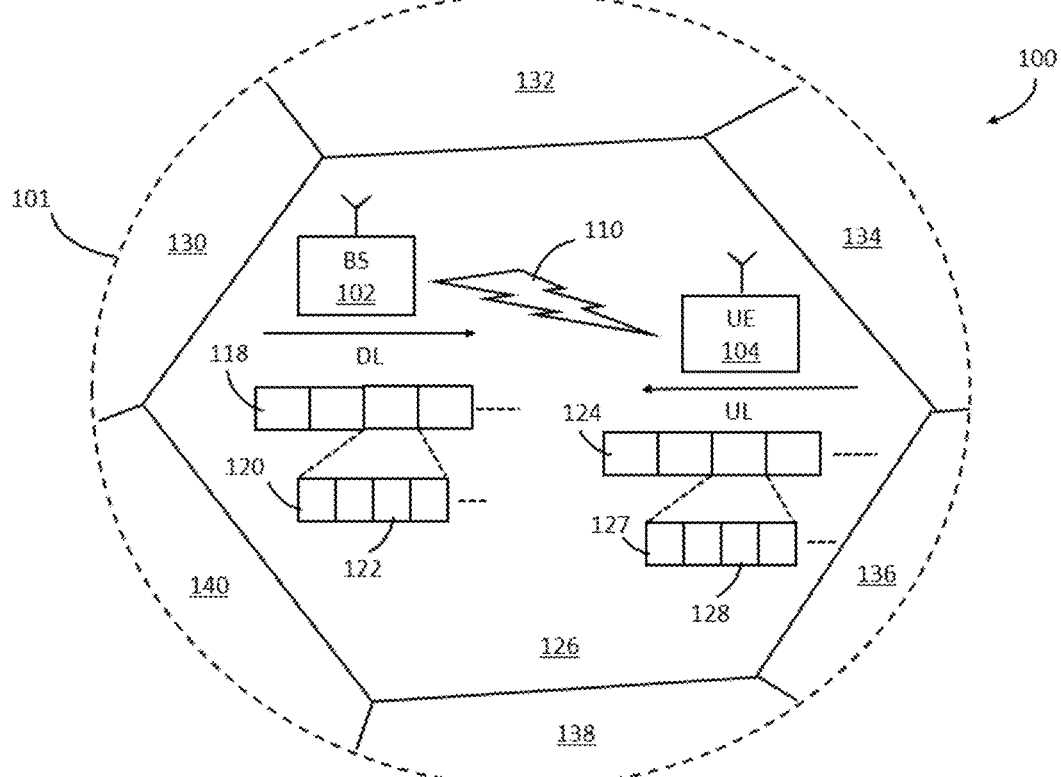
FIG. 1 illustrates an example cellular communication network in which techniques and other aspects disclosed herein may be implemented, in accordance with some embodiments of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
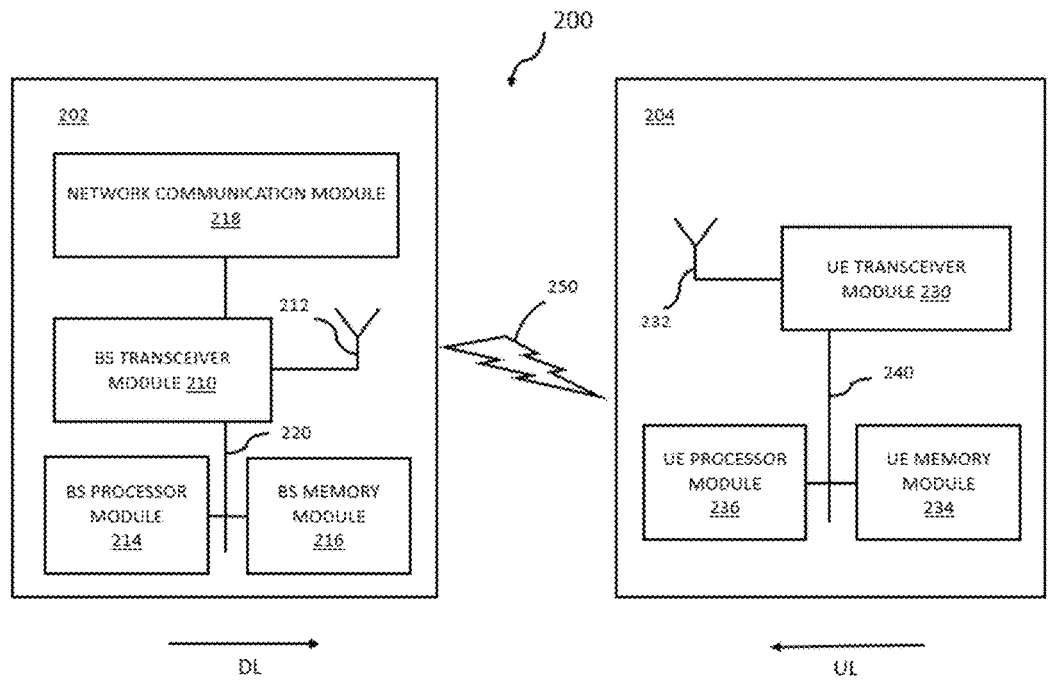
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals, e.g., half-duplexing signals, in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuity that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

There may generally be one IoT cell that supports communication with satellites in NTN network. In one example, the IoT cell may be an omni cell that spans several hundreds of kilometers. When one cell is responsible for supporting large areas, the network capacity may be reduced. In some instances, an NTN cell may be split into a plurality of cell beams to increase the cell capacity.

Figure 3:
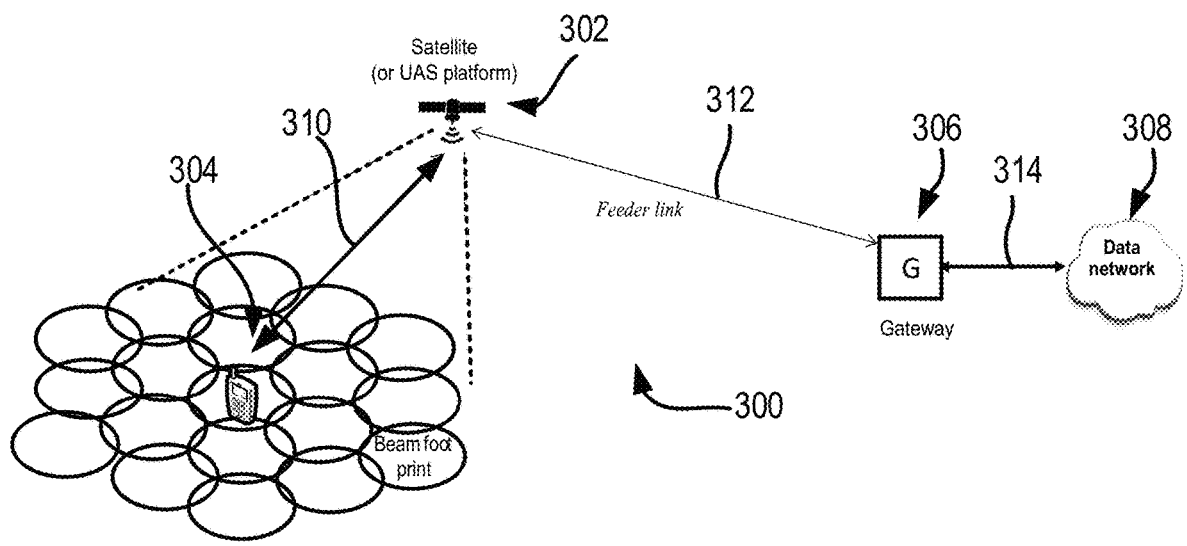
FIG. 3 shows a block diagram of an example non-terrestrial communication network, in accordance with some embodiments of the present disclosure.

FIG. 3 shows a block diagram of an example non-terrestrial communication network 300 including at least one unmanned aerial system based wireless communication nodes, according to some embodiments of the present disclosure. In particular, FIG. 3 shows a communication network 300 including a satellite or an unmanned aerial vehicle (UAV) 302, UE 304, a gateway 306 and a data network 308. The satellite 302 can serve as a platform for a base station, such as, for example, the BS 102 and 202 discussed above in relation to FIGS. 1 and 2, and the UE 304 can be similar to the UE 104 and 204 discussed above in relation to FIGS. 1 and 2. The UE 304 and the BS on the satellite 302 can communicate over a communication link 310, and the BS on the satellite 302 and the gateway 306 can communicate over a feeder link 312. The gateway 306 can communicate with the data network 308 over a data link 314.

Figure 4:
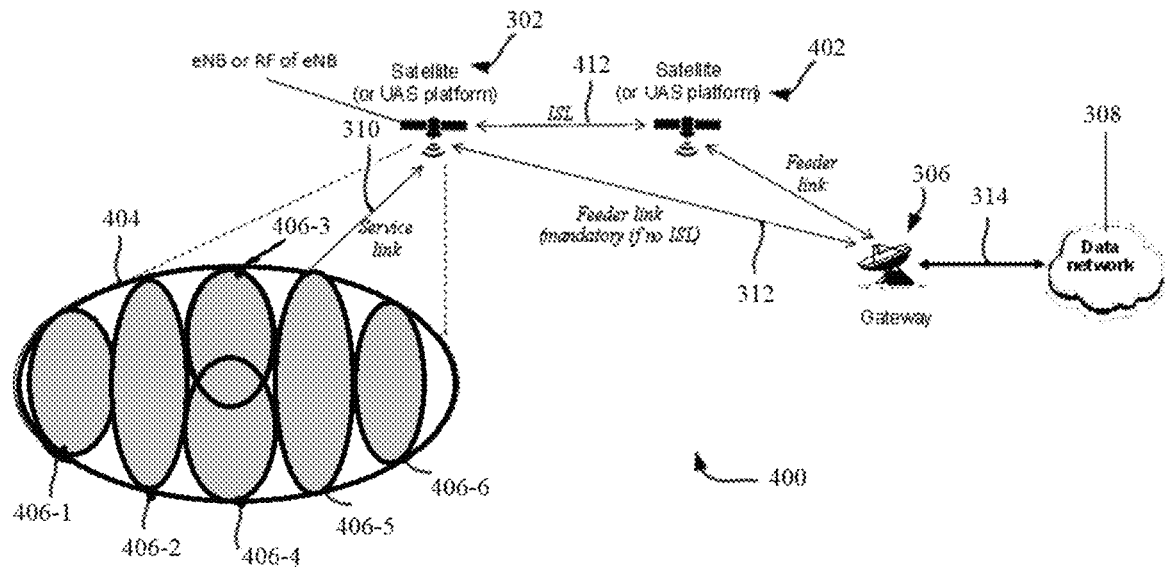
FIG. 4 shows a block diagram of an example non-terrestrial communication network, in accordance with some embodiments of the present disclosure.

FIG. 4 shows another example non-terrestrial communication network 400 including at least one unmanned aerial system based wireless communication nodes, according to some embodiments of the present disclosure. The communication network 400 shown in FIG. 4 is similar to the communication network 300 shown in FIG. 3, but include an additional satellite or UAV platform 402. FIG. 4 depicts the scenario where the communication network includes a constellation of satellites that allow communication between the UE and the gateway or data network. Further, the satellite field of view 404 may be split into several cell beams 406-1 to 406-6.

The gateway 306 can be one of several gateways that can provide connectivity between satellite 302/402 and the data network 308, which can be a public terrestrial data network. The gateway 306 may be deployed across the satellite's targeted coverage area, which can include regional or continental coverage area. In examples where the satellite is a non-geostationary earth orbit satellite ("non-GEO satellite"), the satellite may be served successively by one or several gateways at a time. The communication network may ensure that there is the service link 310 and the feeder link 312 continuity is maintained between successive gateways with sufficient time duration to proceed with mobility anchoring and handover. In some examples, the UE in a cell may be served by only one gateway.

The satellite can implement either a transparent or a regenerative (with on-board processing) payload. In instances where the satellite implements transparent payload, the satellite may carry out radio filtering, frequency conversion, and amplification, thereby repeating the signals. In instances where the satellite platform implements regenerative payload, the satellite can carry out radio frequency filtering, frequency conversion, amplification, as well as demodulation/modulation, switching and/or routing, coding/modulation, etc., effectively carrying out functions, at least in part, of a base station on-board the satellite.

The satellite can generate several beams over a service area that can be bounded by its field of view 404, which can depend on the on-board antenna characteristics and a minimum elevation angle of the satellite. The footprints of satellite beams and cell beams on the surface of the earth may be elliptical in shape. Several cell beams may be contained in the satellite field of view 404. For example, there may be M number of cell beams, where M is a positive integer, contained in the satellite field of view 404. As shown, cell beams 406-1 to 406-6 may be beams split from the NTN satellite beam. The cell beam may be referred to as a cell sector, cell area or synchronization signal block (SSB) beam. Further, the cell beam may be mapped to N satellite beams, where N is a positive integer. The beams may include at least one of primary synchronization signal (PSS) block beam, secondary synchronization signal (SSS) block beam, and so on. The beams may be used to split cell blocks such as PSS, SSS, Master Information Block (MIB), System Information Block (SIB), into a plurality of sub-areas. Each sub-area may correspond to a Physical Random Access Channel (PRACH) resource set and have similar RF propagation delays, channel propagation characteristics, antenna characteristics, spatial code characteristics, and so on.

In instances where the communication system includes constellations of satellites, such as for example, the communication system shown in FIG. 4, the network can include an inter-satellite link ("ISL") 412. In some such instances, the satellites can implement regenerative payload. The ISL can may operate in RF or in optical frequency bands.

Table 1 below lists various types of satellites that can be used to implement the satellite/UAV 302 and 402 shown in FIGS. 3 and 4. The types of satellites and the corresponding information shown in Table 1 are only examples and are not limiting, as other types of platforms and satellites can also be utilized.

TABLE 1

TYPES OF SATELLITES

| Platforms | Altitude range | Orbit | Typical beam footprint size |
|---|---|---|---|
| Low-Earth Orbit (LEO) satellite | 300-1500 km | Circular around the earth | 100-500 km |
| Medium-Earth Orbit (MEO) satellite | 7000-25000 km | | 100-500 km |
| Geostationary Earth Orbit (GEO) satellite | 35786 km | notional station keeping position elevation/azimuth with respect to a given earth point fixed in terms of | 200-1000 km |
| UAS platform (including HAPS) | 8-50 km (20 km for HAPS) | | 5-200 km |
| High Elliptical Orbit (HEO) satellite | 400-50000 km | Elliptical around the earth | 200-1000 km |

In some embodiments, GEO satellite and UAS platforms can be used to provide continental, regional, or local service. In some embodiments, a constellation of LEO and MEO satellites can be used to provide services in both northern and southern hemispheres. In some instances, constellation of satellites can even provide global coverage including the polar regions. In some such instances, appropriate orbit inclination, ISLs and beams can be selected.

2. NPRACH Parameter Configuration Mapping NPRACH Resource to Cell Beams

Figure 5:
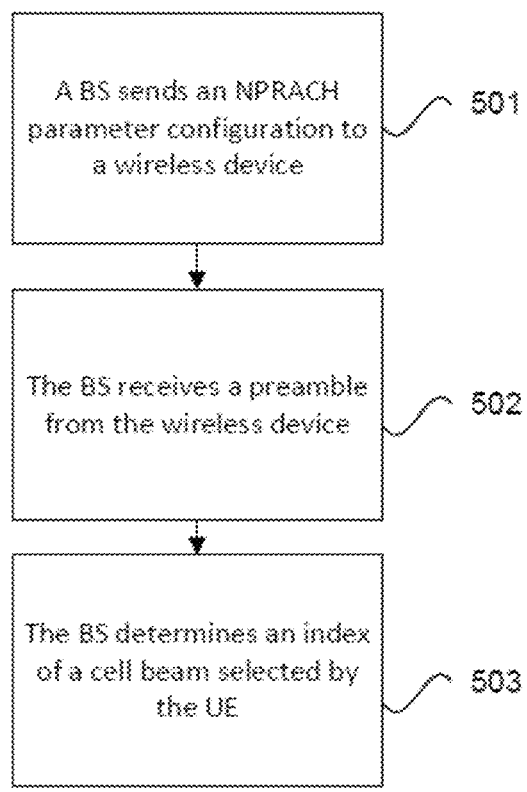
FIG. 5 illustrates a flow chart of an example method of a BS identifying cell beams according to a UE selected preamble, according to one embodiment of the present disclosure.

FIG. 5 illustrates a flow chart of an example method of a BS identifying cell beams according to a UE selected preamble, according to some embodiments of the present disclosure. In block 501, a BS sends a Physical Random Access Channel (PRACH) parameter configuration to a UE. The PRACH configuration maps a plurality of PRACH resources to a plurality of cell beams. In block 502, the BS receives a preamble from the UE. In block 503, the BS determines an index of the selected cell beam based on the mapping in block 501 that maps the PRACH resource to the cell beam.

Figure 6:
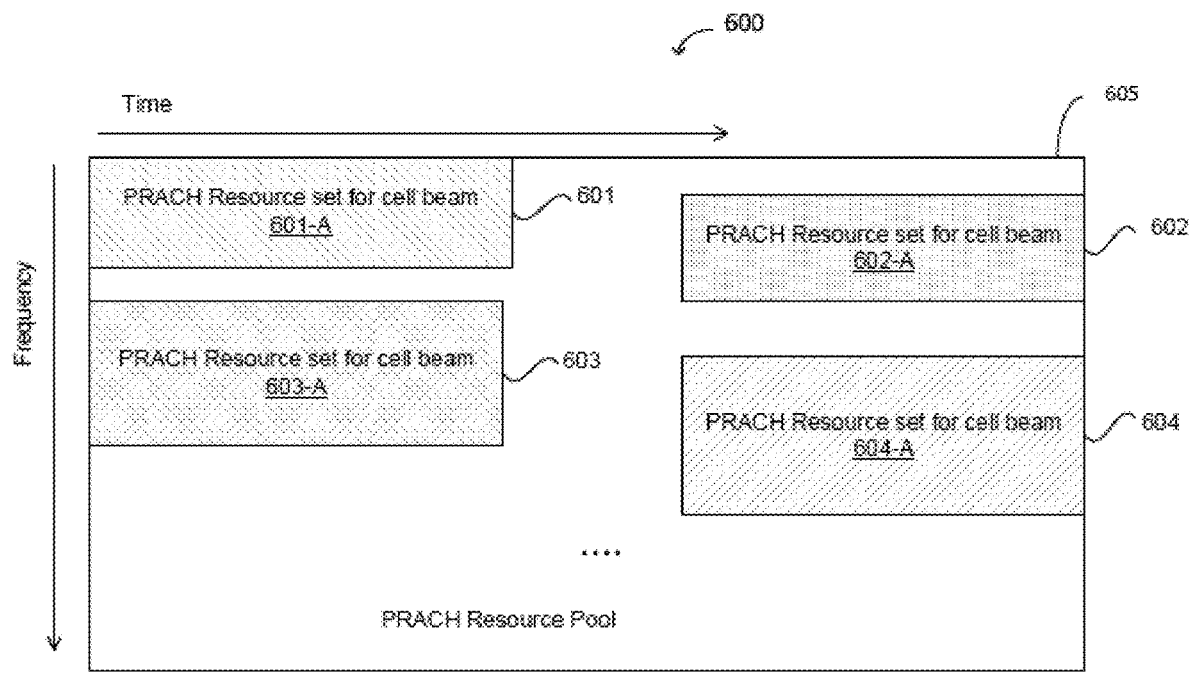
FIG. 6 illustrates a block diagram of an example of a cell beam with various Narrowband Physical Random Access Channel resources, according to some embodiments of the present disclosure in, in accordance with some embodiments of the present disclosure.

FIG. 6 shows a block diagram of an example 600 of a cell beam with various NPRACH resources, according to some embodiments of the present disclosure. Different cell beams may have different NPRACH resources. For example, the time and/or frequency configuration of the preamble and/or Physical Downlink Control Channel (PDCCH) may be different for different cell beams in one cell. Thus, as shown, various cell beams 601 to 604 may be transmitted, where each cell beam 601-604 has a different NPRACH resource set, 601-A to 604-A. Each cell beam 601-604 may have an index identifying the cell beam. When the cell beam is divided into multiple beams, it becomes detectable by the UE. The UE may select the contention based random access resource (CBRA) among the NPRACH resources that correspond to the selected cell beams.

The various cell beams associated with PRACH resource sets may allow for the BS to be aware of the index of the cell beam that a UE selects. A UE may select a cell beam, using the cell beam index, based on the NPRACH resources (e.g., preamble). The UE may subsequently transmit the selected NPRACH preamble to the BS. The BS may schedule radio resources in the cell beam based on the received NPRACH preamble transmitted by the UE. In other words, the BS may become aware of the cell beam index based on the NPRACH preamble that the UE transmitted.

In some embodiments, the mapping of NPRACH resources to cell beams may be explicitly indicated in SIB by a BS. In alternate embodiments, the mapping of NPRACH resources to cell beams may be implicitly indicated based on network deployment. For example, in the event a cell beam number is configured, the cell beam is used, and/or the number of continuous contention based preambles is provided, NPRACH resource mapping may be performed.

Figure 7:
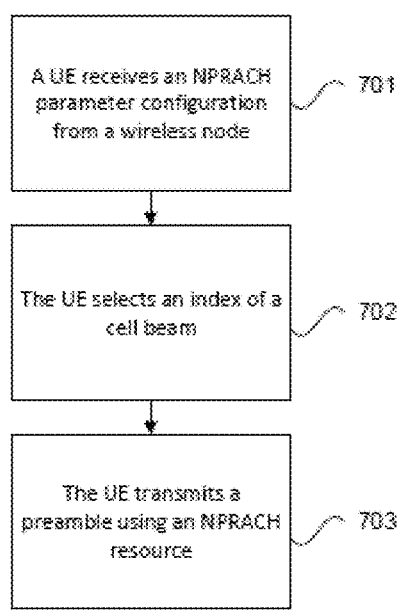
FIG. 7 illustrates a flow chart of an example method of a UE selecting a cell beam, according to some embodiments of the present disclosure.

FIG. 7 illustrates a flow chart of an example method of a UE selecting a cell beam, according to some embodiments of the present disclosure. In block 701, the UE receives a PRACH parameter configuration. The PRACH parameter configuration maps a plurality of PRACH resources to a plurality of cell beams. In block 702, the UE may select an index of a cell beam. In block 703, the UE may transmit a preamble using the PRACH resources that correspond to the index of the selected cell beam, based on the map received from the BS in step 701.

Figure 8:
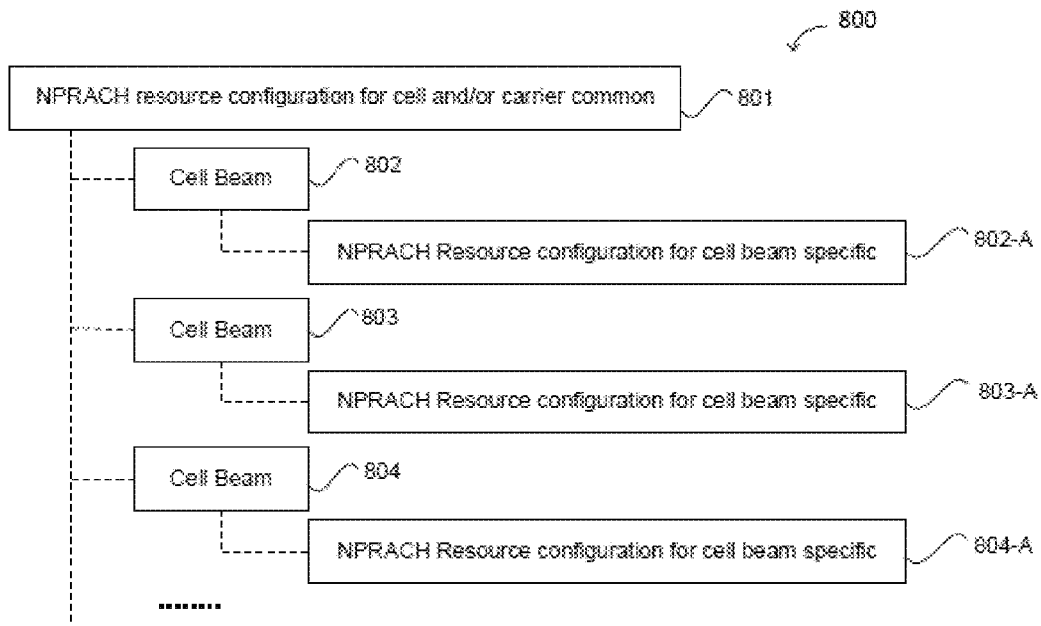
FIG. 8 illustrates a block diagram of an example NPRACH resource configuration per cell beam mapping using a beam cell list, according to some embodiments of the present disclosure.

FIG. 8 illustrates a block diagram of an example NPRACH resource configuration 800 per cell beam mapping using a cell beam list, according to some embodiments of the present disclosure. The NPRACH resource configuration per cell beam in an NB-IoT cell may be based on the cell beam list of the NPRACH resource. In some embodiments, PRACH resource mapping may be performed for eMTC.

The cell beam list of NPRACH resources is shown as 801. The NPRACH resource configuration for cell beams may be unique such that the timing and/or frequency resources of the preamble may make the NPRACH resource identifiable. Thus, a preamble using certain time and/or frequency resources may be mapped to an NPRACH resource configuration, identifying a corresponding cell beam. The cell beam list of NPRACH resources 801 maps a plurality of cell beams 802 to 804 as a cell beam list. Each of the cell beams 802 to 804 in the cell beam list may be mapped to NPRACH resource configurations 802-A to 804-A. In other words, the BS will be able to extract the related cell beam based on a received preamble from the UE, the preamble utilizing the NPRACH resource configurations 802-A to 804-A mapped to cell beams 802 to 804.

In alternate embodiments, the plurality of NPRACH resources may be mapped to an NPRACH resource list. Each of the plurality of NPRACH resources may correspond to a plurality of cell beams included in a cell.

Figure 9:
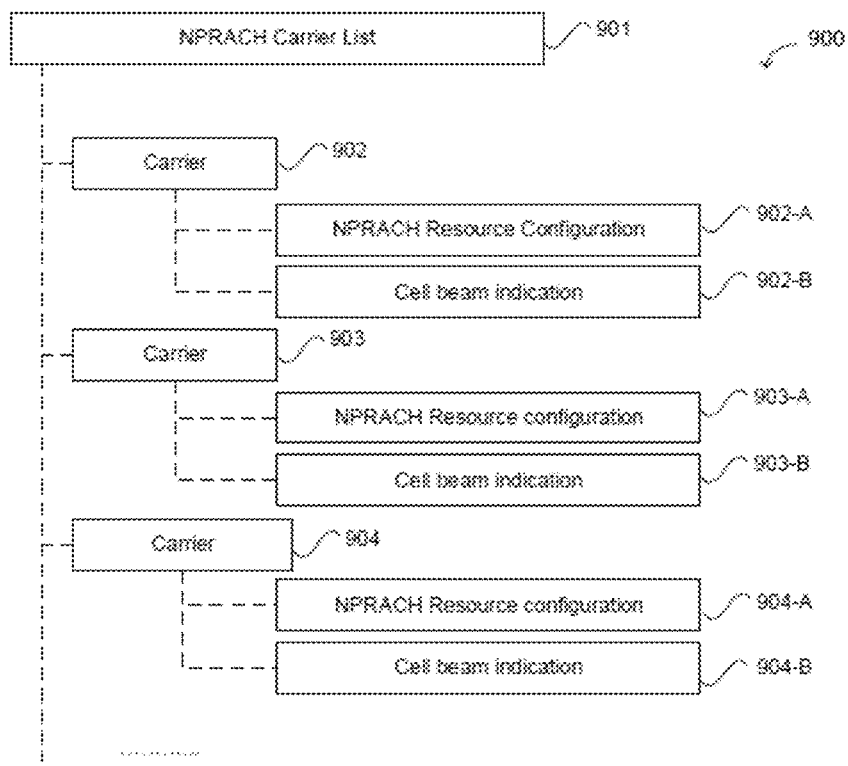
FIG. 9 illustrates a block diagram of an example NPRACH resource configuration per cell beam based on NPRACH carrier mapping, according to some embodiments of the present disclosure.

FIG. 9 illustrates a block diagram of an example NPRACH resource configuration 900 per cell beam based on NPRACH carrier mapping, according to some embodiments of the present disclosure. The NPRACH resource configuration per cell beam in an NB-IoT cell may be based on the NPRACH carrier mapping. The NPRACH carrier list 901 may map a plurality of carriers 902 to 904 to corresponding NPRACH resource configurations 902-A to 904-A and cell beam indicators 902-B to 904-B.

NPRACH carriers 902 to 904 may be configured for each cell beam, where each cell beam may be indicated by a cell beam index 902-B to 904-B. The cell beam indices may be indicated in the NPRACH carrier configuration, where each NPRACH carrier is configured for only one cell beam. Thus, the BS will be able to extract the related NPRACH carrier based on a received preamble from the UE.

In some embodiments, the cell beam indices may be explicitly indicated in the NPRACH carrier configuration. In other embodiments, the cell beam indices may be implicitly based on the cell beam number and the NPRACH carrier number. The condition below shows the relationship between the cell beam and the NPRACH carrier index.

$i^{th}$ Cell Beam=NPRACH carrier index mod $N$

In the condition above, N may be the number of cell beams. Thus, the $i^{th}$ cell beam may be determined by the NPRACH carrier index given the total number of cell beams N.

Figure 10:
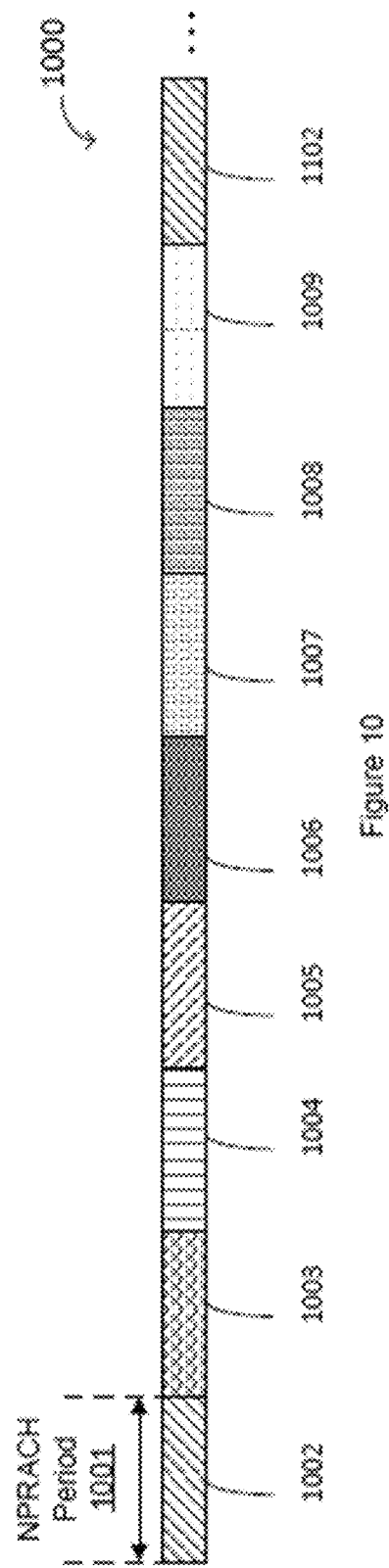
FIG. 10 illustrates a block diagram of an example NPRACH resource configuration per cell beam based on NPRACH periodicity, according to some embodiments of the present disclosure.

FIG. 10 illustrates a block diagram of an example NPRACH resource configuration 1000 per cell beam based on NPRACH periodicity, according to some embodiments of the present disclosure. In some embodiments, PRACH resource mapping may be performed for eMTC. The NPRACH parameter configuration may implicitly map a cell beam to NPRACH resources within an NPRACH period. The NPRACH period may indicate the time interval between adjacent NPRACH resources for different cell beams. For example, a first NPRACH period may correspond to the NPRACH resource for cell beam 1. Further, a second NPRACH period may correspond to the NPRACH resource for cell beam 2, and so on.

As shown, eight NPRACH resources for cell beams numbered 1002 to 1009 may be transmitted. In one embodiment, the NPRACH period 1001 may be the duration of the NPRACH resource for cell beam 1002. The cell beam period may be one or multiple NPRACH periods. The NPRACH resource may be used for a cell beam in the period that the UE detects the PSS/SSS of the cell beam.

Generally, if there are M number of cell beams in a cell, the start time of the NPRACH resource for the $j^{th}$ cell beam can be shown below.

$(SFN*10+\text{Subframe})=\text{NPRACH}_{START}+$
$i*\text{NPRACH}_{PERIOD}, j=i \bmod M$ Where SFN is the current System Frame Number (SFN) number, Sub frame is the current subframe number, $\text{NPRACH}_{START}$ is the start time (subframe) of the first NPRACH resource in the SFN wraparound, $\text{NPRACH}_{PERIOD}$ is the NPRACH period with unit of subframe, M is the total number of cell beams in the cell, j is the $j^{th}$ cell beam, and both i and j are non-negative integers.

Figure 11:
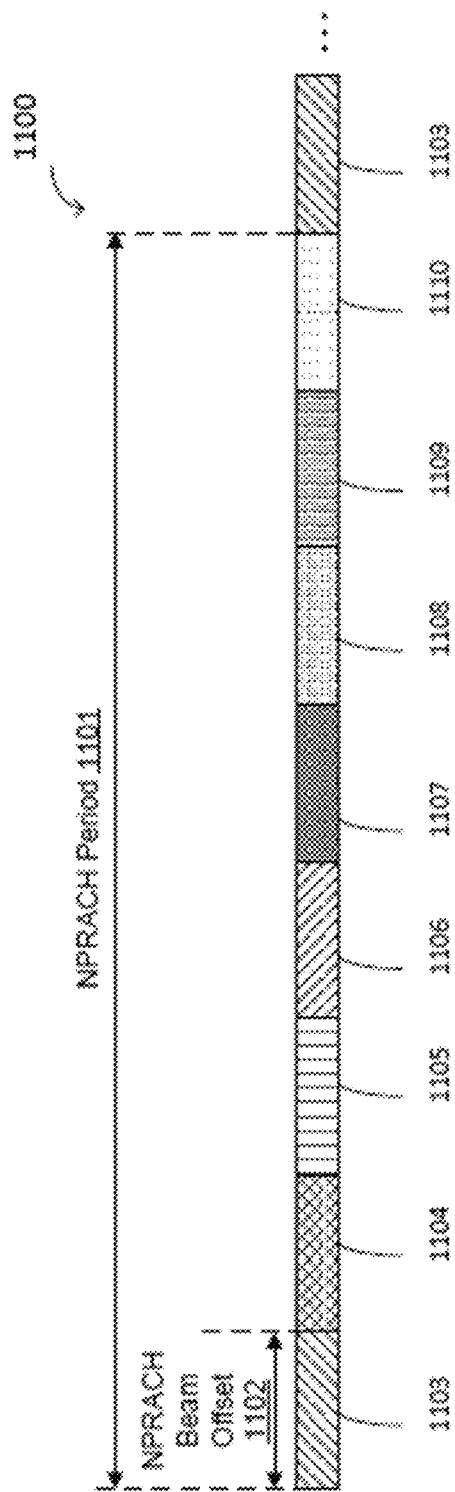
FIG. 11 illustrates a block diagram of an example NPRACH resource configuration per cell beam based on NPRACH periodicity and NPRACH beam offset, according to some embodiments of the present disclosure.

FIG. 11 illustrates a block diagram of an example NPRACH resource configuration 1100 per cell beam based on NPRACH periodicity and NPRACH beam offset, according to some embodiments of the present disclosure. In some embodiments, PRACH resource mapping may be performed for eMTC. The NPRACH parameter configuration may implicitly map a cell beam to beam offsets. The beam offsets may be a time interval between adjacent NPRACH resources for different NPRACH resources for cell beams. For example, the beam offset 1102 may be the time from the start of the first NPRACH resource for beam 1103 to the time of the second NPRACH resource for beam 1104. The beam offsets may last a duration of time less than or equal to the NPRACH period. The cell beams may correspond to the NPRACH resources in the beam offset.

The NPRACH period may indicate the time interval between NPRACH resources for the same cell beam index. The cell beam period may be one or more multiple NPRACH periods. The NPRACH resource may be used for a cell beam in the period that the UE detects the PSS/SSS of the cell beam.

As shown, eight cell beams numbered 1103 to 1110 may be transmitted. The NPRACH period 1101 may include NPRACH resources for several cell beams. Thus, the NPRACH period 1101 may include the first NPRACH resource in the time domain corresponding to the first cell beam index 1103, the NPRACH beam offset for a second NPRACH resource in the time domain corresponding to a second cell beam index 1104, and so on, until the NPRACH resource for cell 1103 is transmitted again.

Generally, if there are M number of cell beams in a cell, the start time of the NPRACH resource for the $j^{th}$ cell beam can be determined as shown below.

$$(SFN*10+\text{Subframe})=\text{NPRACH}_{START}+ i*\text{NPRACH}_{PERIOD}, j=\text{NPRACH}_{PERIOD} \bmod M$$

or $$SFN*10+\text{subframe}=\text{NPRACH}_{START}+j*\text{NPRACH beam offset}$$

Where SFN is the current SFN number, Subframe is the current subframe number, $\text{NPRAC}_{HSTART}$ is the start time of the first NPRACH resource in the SFN wraparound, M is the total number of cell beams in the cell, and j is the $j^{th}$ cell beam, where j and i are non-negative integers.

Figure 12:
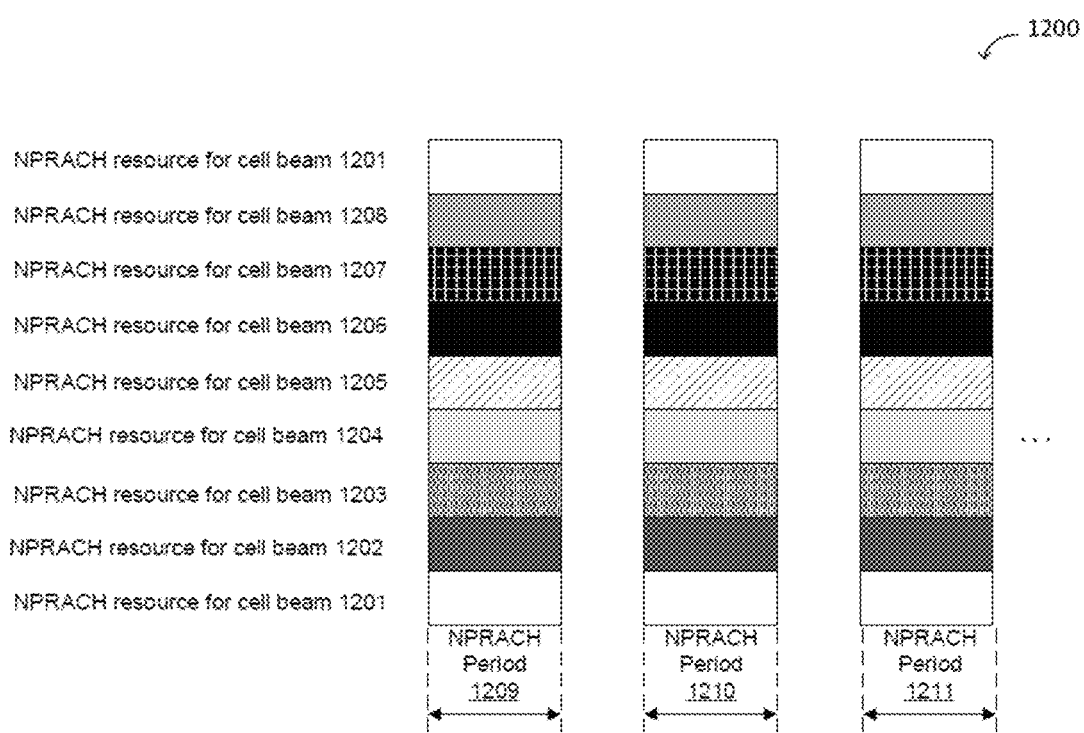
FIG. 12 illustrates a block diagram of an example NPRACH resource configuration per cell beam based on NPRACH resource frequency division, according to some embodiments of the present disclosure.

FIG. 12 illustrates a block diagram of an example NPRACH resource configuration 1200 per cell beam based on NPRACH resource frequency division, according to some embodiments of the present disclosure. In some embodiments, PRACH resource mapping may be performed for eMTC. The NPRACH parameter configuration may map cell beams to the frequency-domain NPRACH resources within an NPRACH period. For example, in the same NPRACH period, a first preamble may correspond with cell beam index 1, while a second preamble may correspond with cell beam index 2, and so on.

Generally, if there are M number of cell beams in a cell, then NPRACH resources for the $j^{th}$ cell beam can be determined as shown below.

$$j=(\text{NPRACH}_{PREAMBLE.INDEX}-\text{PRACH}_{SUBCARRIER.OFFSET}) \bmod M$$

Where $\text{PRACH}_{SUBCARRIER.OFFSET}$ is the frequency starting location of the PRACH resource. As is configured in SIB, the preamble may not start from 0 and may instead start at $\text{PRACH}_{SUBCARRIER.OFFSET}$. In the case of the $j^{th}$ cell beam starting from 0 and not 1, then for M number of cell beams in the cell, NPRACH resources for the $j^{th}$ cell beam can be determined according to the condition below.

$$j-1=(\text{NPRACH}_{PREAMBLE.INDEX}-\text{PRACH}_{SUBCARRIER.OFFSET}) \bmod M$$

In a contention based random access procedure, if the number of continuous contention based preambles per cell beam N is provided, for example by SIB, and if there are M number of cell beams in the cell, then NPRACH resources for the $j^{th}$ cell beam can be determined according to the condition below.

$$j = \frac{(\text{NPRACH}_{PREAMBLE.INDEX}-\text{PRACH}_{SUBCARRIER.OFFSET})}{N} \bmod M$$

In the case of the $j^{th}$ cell beam starting from 0 and not 1, then the NPRACH resources for the $j^{th}$ cell beam given N number of continuous contention based preambles and M number of cell beams can be determined as shown below.

$$j-1 = \frac{(\text{NPRACH}_{PREAMBLE.INDEX}-\text{PRACH}_{SUBCARRIER.OFFSET})}{N} \bmod M$$

In some embodiments, the continuous contention based preambles per cell beam N may be provided by SIB. In other embodiments, the number of continuous contention based preambles per cell beam N may be implicitly indicated according to the number of continuous contention based preambles per cell beam, the number of continuous contention based preambles, and the number of cell beams as shown below.

$$\text{Contention Based Preambles per Cell Bean} = \frac{\text{Continuous Contention Based Preambles}}{\text{Number of Cell Beams}}$$

In the event the contention based preambles in one NPRACH period are not enough for all of the cell beams, cell beams may be mapped to several PRACH periods. For example, the cell beam indices may be mapped to the NPRACH preambles from the frequency domain, in increasing order of preamble indices within a single NPRACH period.

As shown, NPRACH resources for cell beams 1201-1208 are divided in the frequency domain. The NPRACH resources for cell beams 1201-1208 are included in an NPRACH period 1209. The number of contention based preambles in one NPRACH period are not enough. Thus, the cell beam index 1201 may be repeated in NPRACH periods 1210 and 1211.

In the event the number of continuous contention based preambles per cell beam N is provided, then the first N preambles in the first NPRACH period may be used for a first cell beam. Further the second N preambles in the first NPRACH period may be used for a second cell beam. This may repeat until the $k^{th}$ N preamble is used for the $k^{th}$ cell beam. Thus, the contention based preambles in the first NPRACH period may be mapped.

Subsequently, the first N preambles in the second NPRACH period may be used for the $k^{th}+1$ cell beam, and the second N preambles in the second NPRACH period may be used for the k+2 cell beam. This may repeat until all of the cell beams are mapped to the contention based preambles.

As shown, eight NPRACH preambles may be mapped to cell beam indices 1201 to 1208 respectively. In the current example, there may be nine NPRACH preambles, thus cell beam index 1201 is repeated. This pattern may be repeated for NPRACH periods 1209, 1210 and 1211 such that all cell beams are mapped to the contention based preambles.

Figure 13:
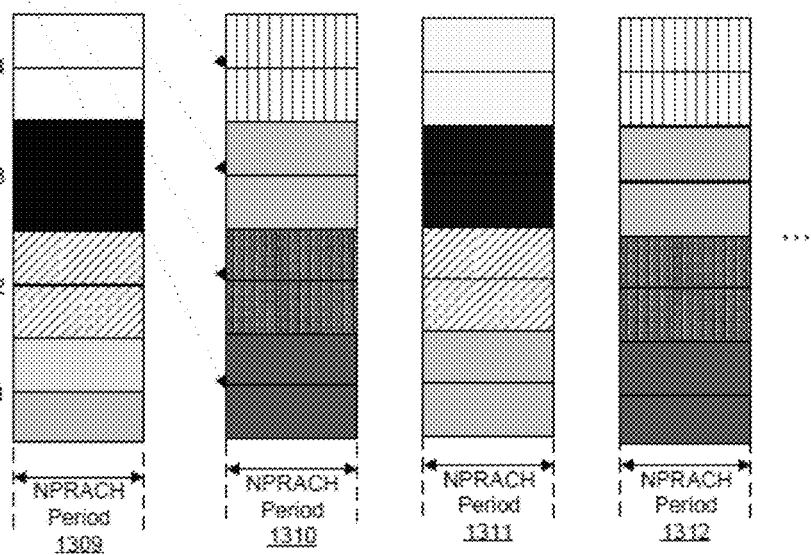
FIG. 13 illustrates a block diagram of an example NPRACH resource configuration per cell beam based on NPRACH frequency division and time division, according to some embodiments of the present disclosure.

FIG. 13 illustrates a block diagram of an example NPRACH resource configuration 1300 per cell beam based on NPRACH frequency division and time division, according to some embodiments of the present disclosure. The NPRACH parameter configuration may map cell beams to frequency-domain NPRACH resources and/or time-domain NPRACH resources. In other words, different NPRACH resources in the frequency domain and time domain may be mapped to different contention based preambles. In some embodiments, PRACH resource mapping may be performed for eMTC.

Generally, if there are M number of cell beams in a cell, and there are L number of contention based preambles in one NPRACH period, in the event the number of continuous contention based preambles per cell N is provided, for example by SIB, then the preambles in one NPRACH period may be mapped to k number of cell beams, as shown below.

$$K \text{ number of Cell Beams} = \frac{\text{Contention Based Preambles in one } NPRACH \text{ period } L}{\text{Continuous Contention Based Preambles per Cell Beam } N}$$

The $i^{th}$ cell beam may be mapped to the preambles as shown below, where $PRACH_{SUBCARRIER.OFFSET}$ is the frequency starting location of the PRACH resource. As configured in SIB, the preamble may not start from 0 but may instead start at $PRACH_{SUBCARRIER.OFFSET}$.

$$(NPRACH_{PREAMBLE.INDEX} - PRACH_{SUBCARRER.OFFSET}) \bmod \frac{M}{k} = i \bmod \frac{M}{k}$$

$$(\text{Preamble Index} - PRACH_{SUBCARRER.OFFSET}) \bmod N = i \bmod N$$

In the event the contention based preambles in one NPRACH period are not enough for all of the cell beams, cell beams may be mapped to several PRACH periods. For example, the cell beam indices may be mapped to the NPRACH preambles from the frequency domain, in increasing order of preamble indices within a single NPRACH period. Further, if there are still more contention based preambles to be mapped to cell beams, then after using all of the available NPRACH preambles in the frequency domain, the cell beam indices may be mapped to the NPRACH preambles from the time domain, in increasing order of NPRACH period indices.

In the event the number of continuous contention based preambles per cell beam N is provided, then the first N preambles in the first NPRACH period may be used for a first cell beam. Further the second N preambles in the first NPRACH period may be used for a second cell beam. This may repeat until the $k^{th}$ N preamble is used for the $k^{th}$ cell beam. Thus, the contention based preambles in the first NPRACH period may be mapped.

Subsequently, the first N preambles in the second NPRACH period may be used for the $k^{th}+1$ cell beam, and the second N preambles in the second NPRACH period may be used for the k+2 cell beam. This may repeat until all of the cell beams are mapped to the contention based preambles.

The total CBRA resource numbers may be configured and used by the cell beams. Each cell beam may use a preconfigured number of continuous contention based preambles per cell beam (CFRA).

As shown, there are eight contention based preambles per NPRACH period. The number of contention based preambles per cell N is 2. Thus, cell beam indices 1301, 1302, 1303, and 1304 are mapped to the first NPRACH period 1309. Further, cell beam indices 1305, 1306, 1307 and 1308 are mapped to the second NPRACH period 1310. The next cell beam indices 1301, 1302, 1303 and 1304 are mapped to the third NPRACH period 1311. Similarly, cell beam indices 1305, 1306, 1307, and 1308 are mapped to the fourth NPRACH period 1312.

Figure 16:
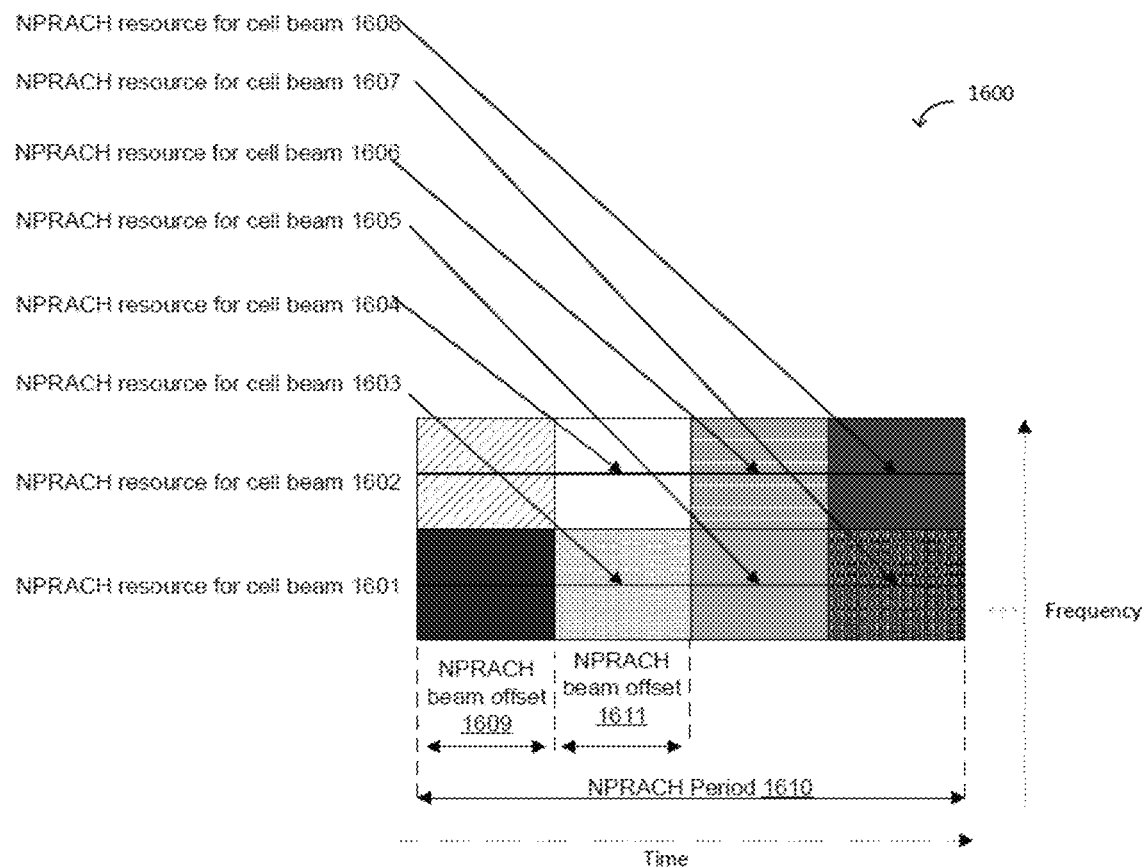
FIG. 16 illustrates a block diagram of an example NPRACH resource configuration per cell beam based on implicitly mapping NPRACH periodicity, NPRACH beam offset, and the number of continuous contention based preambles per cell beam using frequency and time division, first by the time-domain and second by the frequency-domain in a PRACH period, according to some embodiments of the present disclosure.

As discussed herein, the NPRACH parameter configuration may map cell beams to frequency-domain NPRACH resources and/or time domain NPRACH resources. FIG. 16 illustrates a block diagram of an example NPRACH resource configuration 1600 per cell beam based on implicitly mapping NPRACH periodicity, NPRACH beam offset, and the number of continuous contention based preambles per cell beam using frequency and time division, first by the frequency-domain and second by the time-domain in a PRACH period, according to some embodiments of the present disclosure.

As shown, within one NPRACH period 1610, the NPRACH resources are mapped to cell beams first in the frequency-domain. For example, NPRACH resource for cell beam 1601 is mapped to the first two contention based preambles. This mapping may occur in the first NPRACH beam offset 1609. Next, NPRACH resources for cell beam 1602 are mapped to two adjacent contention based preambles in the frequency-domain. In other words, NPRACH resources for cell beam 1602 are mapped to the preambles above the first mapping that was performed using NPRACH resources for cell beam 1601. This may be repeated until all of the cell beams are mapped to the contention based preambles in the frequency-domain. Subsequently, NPRACH resources for cell beam 1603 are mapped to the contention based preambles in the time domain adjacent to the contention based preambles in the first mapping 1601, to the next two contention based preambles in the time-domain. In other words, NPRACH resource for cell beam 1603 may be mapped according to the second NPRACH beam offset 1611. Thus, the time-domain may be used for filling the remaining NPRACH resources for cell beams.

Figure 17:
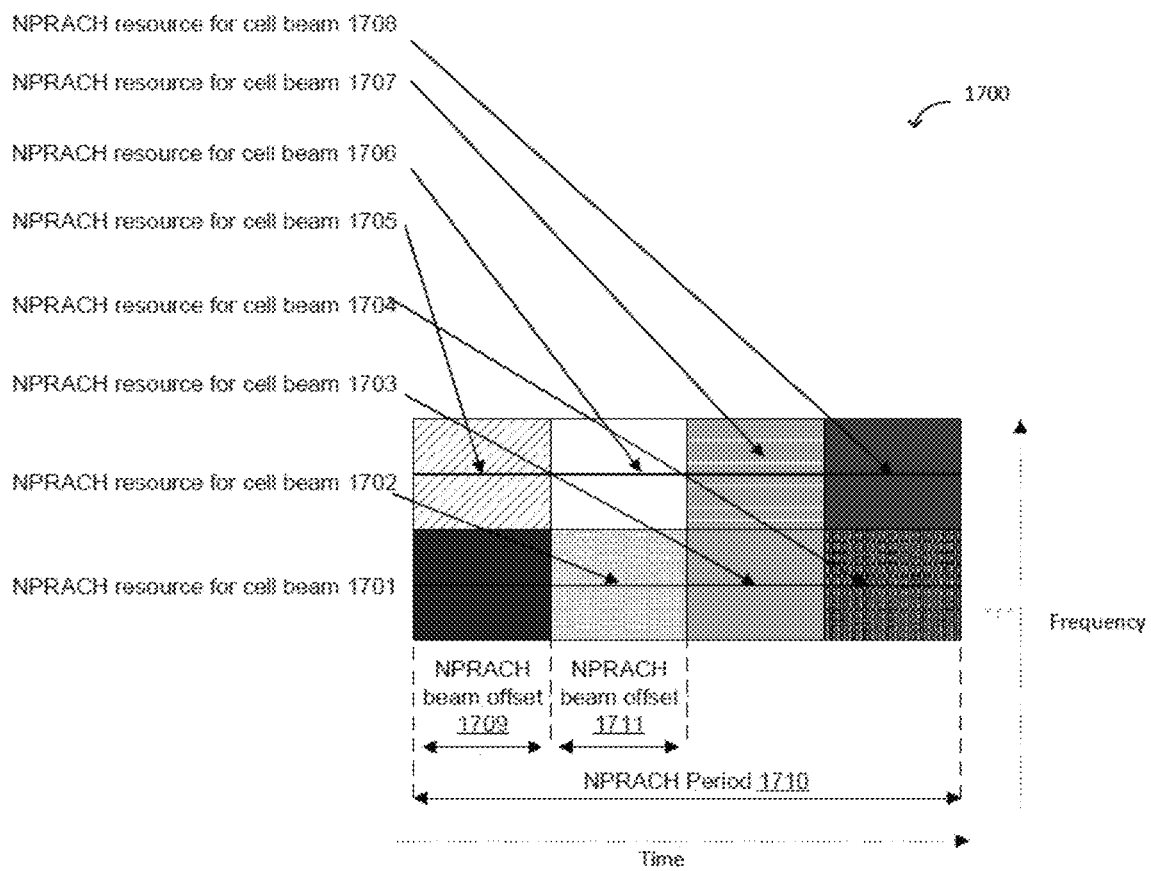
FIG. 17 illustrates a block diagram of an example NPRACH resource configuration per cell beam based on implicitly mapping NPRACH periodicity, NPRACH beam offset, and the number of continuous contention based preambles per cell beam using frequency and time division, first by the frequency-domain and second by the time-domain in a PRACH period, according to some embodiments of the present disclosure.

FIG. 17 illustrates a block diagram of an example NPRACH resource configuration 1700 per cell beam based on implicitly mapping NPRACH periodicity, NPRACH beam offset, and the number of continuous contention based preambles per cell beam using frequency and time division, first by the time-domain and second by the frequency-domain in a PRACH period, according to some embodiments of the present disclosure.

As shown, within one NPRACH period 1710, the NPRACH resources are mapped to cell beams first in the time-domain. For example, NPRACH resource for cell beam 1701 is mapped to the first two contention based preambles. This mapping may occur in the first NPRACH beam offset 1709. Next, NPRACH resources for cell beam 1702 are mapped to two adjacent contention based preambles in the time-domain. In other words, NPRACH resources for cell beam 1702 are mapped in the second NPRACH beam offset 1711. This may be repeated until all of the cell beams are mapped to the contention based preambles in the time-domain. Subsequently, NPRACH resources for cell beam 1706 are mapped to the adjacent contention based preambles in the frequency domain, e.g. above the first mapping that was performed using NPRACH resources for cell beam 1701. In other words, the frequency-domain is used for filling the remaining NPRACH resources for cell beams.

The NPRACH parameter configuration may map cell beams to a predefined number of frequency-domain NPRACH resources within one NPRACH period in the time-domain. Additionally, the mapping may further indicate a number of cell beams per Random Access Channel (RACH) occasions. The total number of continuous contention based preambles per cell beam and cell beam number per RACH occasion may be configured. Thus, the relationship between the number of CBRA used for cell beams, $N_{CBRA}$, cell beam number per RACH occasion, Beam.Number$_{pER.RO}$, number of continuous contention based preambles per cell beam, Contention.Preambles and RA resources for CFRA, RA.Resource, may be shown below.

$$N_{CBRA} = \text{BeamNumber}_{perRo} * \text{CBRAPreambleNumber}_{perBeam}$$

Thus, the number of CBRA per each cell beam may be determined by multiplying the cell beam number per RACH occasion with the number of continuous contention based preambles per cell beam.

In some embodiments, the predefined number of frequency-domain NPRACH resources corresponding to cell beams are not continuous in the frequency-domain. Thus, in the event the CBRA resource for cell beams are not continuous, the mapping between the RA resource and the cell beam in each RACH occasion may be shown below. In each RACH occasion, the start preamble for each cell beam may be:

$$PRACH_{SUBCARRIER.OFFSET} + n * \frac{\text{Total } RA \text{ Resource per } RACH \text{ Occasion}}{\text{Cell Beam Number per } RACH \text{ Occasion}}$$

Where n is an integer ranging from 0 to the cell beam number per RACH occasion. The $PRACH_{SUBCARRIER.OFFSET}$ is the frequency starting location of the PRACH resource. As configured in SIB, the preamble may not start from 0 but may instead start at $PRACH_{SUBCARRIER.OFFSET}$. In some embodiments, the total RA Resource per RACH occasion can be configured by SIB. In alternate embodiments, the total RA Resource per RACH occasion may be determined using the relationship between the cell beam number per RACH occasion and the number of continuous contention based preambles per cell beam, as shown below.

RA Resource=Cell Beam Number*Continuous Contention Based Preamble *per* beam

Figure 14:
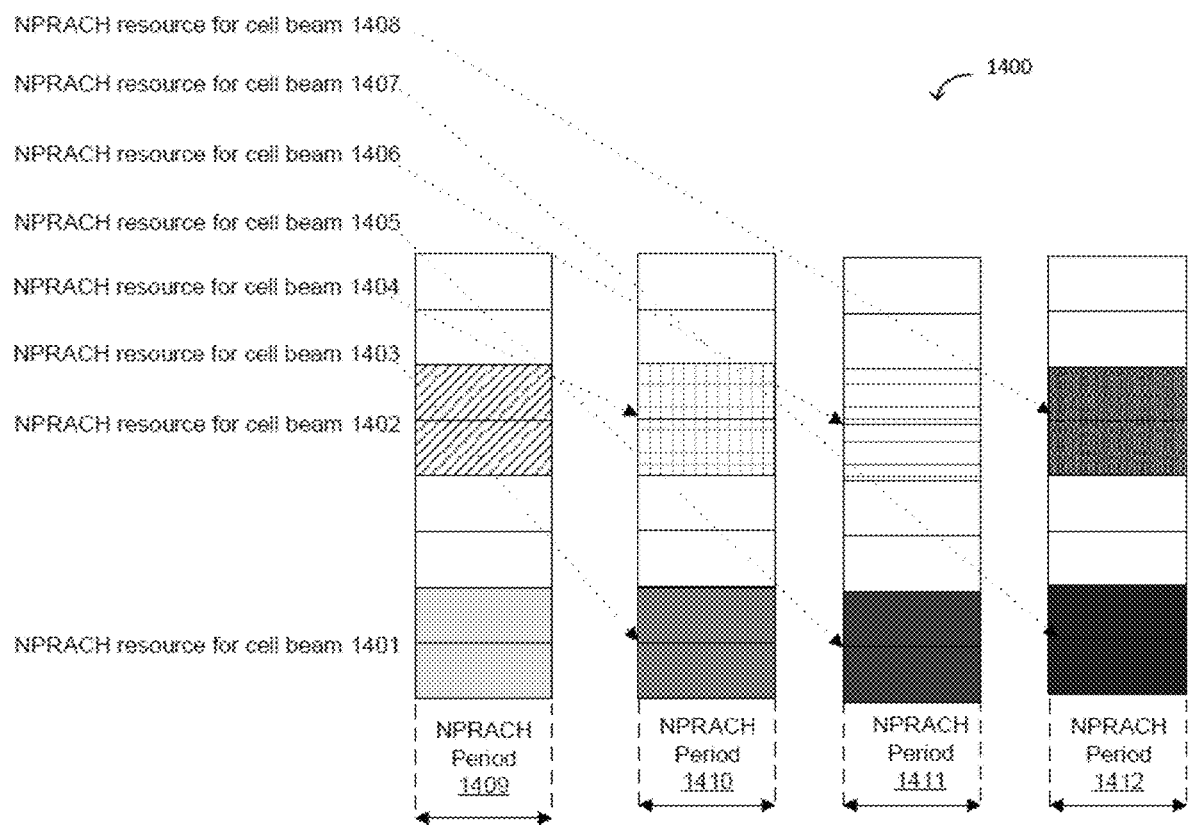
FIG. 14 illustrates a block diagram of an example NPRACH resource configuration per cell beam based on NPRACH resource frequency division and time division with configured cell beam numbers per RACH occasion and non continuous contention based preambles per cell beam, according to some embodiments.

FIG. 14 illustrates a block diagram of an example NPRACH resource configuration 1400 per cell beam based on NPRACH resource frequency division and time division with configured cell beam numbers per RACH occasion and non continuous contention based preambles per cell beam, according to some embodiments.

As shown, there are eight contention based preambles per NPRACH period. The number of continuous contention based preambles per cell beam is two. Further, the cell beam number per RACH occasion is also two. Thus, NPRACH resource for cell beams 1401 and 1402 are mapped to the first NPRACH period 1409. However, the NPRACH resource for cell beams 1401 and 1402 are not mapped to continuous contention based preambles. In other words, there is a delay in frequency from mapping the first NPRACH resource for cell beam 1401 to mapping the second NPRACH resource for cell beam 1402. Further, NPRACH resource for cell beams 1403 and 1404 are mapped to the second NPRACH period 1410. Similarly, there is a frequency delay between mapping the NPRACH resource for cell beams 1403 and mapping the NPRACH resource for cell beams 1404. The next NPRACH resource for cell beams 1405 and 1406 are mapped to the third NPRACH period 1411. Similarly, there is a frequency delay between mapping the NPRACH resource for cell beams 1405 and mapping the NPRACH resource for cell beams 1406. Further, the next NPRACH resource for cell beams 1407 and 1408 are mapped to the fourth NPRACH period 1412. There is a frequency delay between mapping the NPRACH resource for cell beams 1407 and mapping the NPRACH resource for cell beams 1408.

In each RACH occasion, the frequency start location of the PRACH resource may be determined by $PRACH_{SUBCARRIER.OFFSET}$. As configured in SIB, the preamble may not start from 0 but may instead start at $PRACH_{SUBCARRIER.OFFSET}$.

In some embodiments, the predefined number of frequency-domain NPRACH resources corresponding to cell beams are continuous in the frequency-domain. Thus, in the event the CBRA resources for cell beams are continuous, the mapping between the RA resource and the cell beam in each RACH occasion may be shown below. In each RACH occasion, the start preamble for each cell beam may be: $PRACH_{SUBCARRIER.OFFEST}$+n*Number of Continuous Contention Based Preambles Per Cell Beam Where n is an integer ranging from 0 to the cell beam number per RACH occasion.

Figure 15:
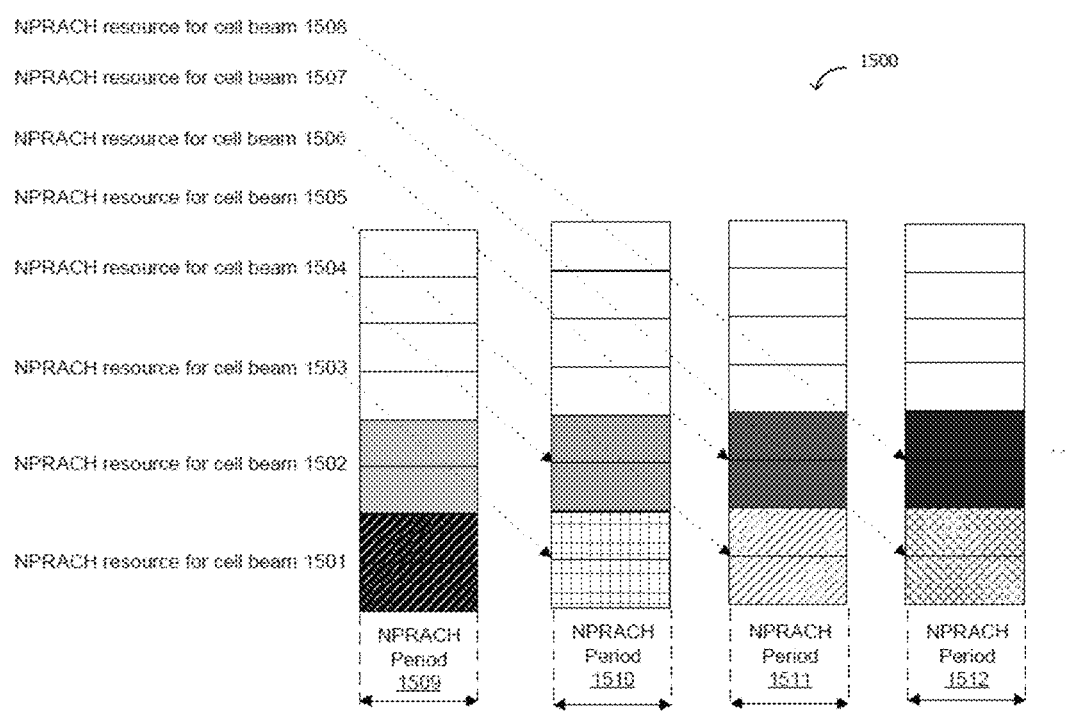
FIG. 15 illustrates a block diagram of an example NPRACH resource configuration per cell beam based on NPRACH resource frequency division and time division with configured cell beam numbers per RACH occasion and continuous contention based preambles per cell beam, according to one embodiment.

FIG. 15 illustrates a block diagram of an example NPRACH resource configuration 1500 per cell beam based on NPRACH resource frequency division and time division with configured cell beam numbers per RACH occasion and continuous contention based preambles per cell beam, according to some embodiments of the present disclosure.

As shown, there are eight contention based preambles per NPRACH period. The number of continuous contention based preambles per cell beam is two. Further, the cell beam number per RACH occasion is also two. Thus, NPRACH resource for cell beams 1501 and 1502 are mapped to the first NPRACH period 1509. Further, NPRACH resource for cell beams 1503 and 1504 are mapped to the second NPRACH period 1510. The next NPRACH resource for cell beams 1505 and 1506 are mapped to the third NPRACH period 1511. Further, the next NPRACH resource for cell beams 1507 and 1508 are mapped to the fourth NPRACH period 1512.

The mapping strategy discussed herein, between a mapping plurality of NPRACH resource and a plurality of cell beams, may also be used for mapping between a plurality of eMTC PRACH resource and a plurality of cell beams.

3. Alternate PRACH Period Configuration for eMTC

Specifically with respect to eMTC, an alternate PRACH period configuration may be configured. Generally, for a BS to differentiate between preambles, an NPRACH period should be larger than the uplink (UL) propagation delay spread. In other words, the time interval between preambles should be larger than the maximal delay deviation between different UEs. In NTN, the maximal uplink propagation delay spread may be larger than 100ms. Thus, the PRACH period may be determined by the PRACH configuration index.

Table 2 below shows that the SFN and subframe number determine the NPRACH preamble interval. In the event the maximal interval is less than the PRACH period, the BS may not be able to differentiate between various UEs using preambles in various time domain.

TABLE 2

FRAME STRUCTURE TYPE 1 RANDOM ACCESS CONFIGURATION FOR PREAMBLE FORMATS 0 TO 3.

| RACH Configuration Index | Preamble Format | System frame number | Subframe number | PRACH Configuration Index | Preamble Format | System frame number | Subframe number |
| --- | --- | --- | --- | --- | --- | --- | --- |
| 0 | 0 | Even | 1 | 32 | 2 | Even | 1 |
| 1 | 0 | Even | 4 | 33 | 2 | Even | 4 |
| 2 | 0 | Even | 7 | 34 | 2 | Even | 7 |
| 3 | 0 | Any | 1 | 35 | 2 | Any | 1 |
| 4 | 0 | Any | 4 | 36 | 2 | Any | 4 |
| 5 | 0 | Any | 7 | 37 | 2 | Any | 7 |
| 6 | 0 | Any | 1, 6 | 38 | 2 | Any | 1, 6 |
| 7 | 0 | Any | 2, 7 | 39 | 2 | Any | 2, 7 |
| 8 | 0 | Any | 3, 8 | 40 | 2 | Any | 3, 8 |
| 9 | 0 | Any | 1, 4, 7 | 41 | 2 | Any | 1, 4, 7 |
| 10 | 0 | Any | 2, 5, 8 | 42 | 2 | Any | 2, 5, 8 |
| 11 | 0 | Any | 3, 6, 9 | 43 | 2 | Any | 3, 6, 9 |
| 12 | 0 | Any | 0, 2, 4, 6, 8 | 44 | 2 | Any | 0, 2, 4, 6, 8 |
| 13 | 0 | Any | 1, 3, 5, 7, 9 | 45 | 2 | Any | 1, 3, 5, 7, 9 |
| 14 | 0 | Any | 0, 1, 2, 3, 4, 5, 6, 7, 8, 9 | 46 | N/A | N/A | N/A |
| 15 | 0 | Even | 9 | 47 | 2 | Even | 9 |
| 16 | 1 | Even | 1 | 48 | 3 | Even | 1 |
| 17 | 1 | Even | 4 | 49 | 3 | Even | 4 |
| 18 | 1 | Even | 7 | 50 | 3 | Even | 7 |
| 19 | 1 | Any | 1 | 51 | 3 | Any | 1 |
| 20 | 1 | Any | 4 | 52 | 3 | Any | 4 |
| 21 | 1 | Any | 7 | 53 | 3 | Any | 7 |
| 22 | 1 | Any | 1, 6 | 54 | 3 | Any | 1, 6 |
| 23 | 1 | Any | 2, 7 | 55 | 3 | Any | 2, 7 |
| 24 | 1 | Any | 3, 8 | 56 | 3 | Any | 3, 8 |
| 25 | 1 | Any | 1, 4, 7 | 57 | 3 | Any | 1, 4, 7 |
| 26 | 1 | Any | 2, 5, 8 | 58 | 3 | Any | 2, 5, 8 |
| 27 | 1 | Any | 3, 6, 9 | 59 | 3 | Any | 3, 6, 9 |
| 28 | 1 | Any | 0, 2, 4, 6, 8 | 60 | N/A | N/A | N/A |
| 29 | 1 | Any | 1, 3, 5, 7, 9 | 61 | N/A | N/A | N/A |
| 30 | N/A | N/A | N/A | 62 | N/A | N/A | N/A |
| 31 | 1 | Even | 9 | 63 | 3 | Even | 9 |

Similarly, Table 3 below describes the frame structure type 2 random access configurations for preamble formats 0 to 4. The Density per 10 ms $D_{RA}$ may determine the NPRACH preamble interval in Table 3.

TABLE 3

FRAME STRUCTURE TYPE 2 RANDOM ACCESS CONFIGURATIONS FOR PREAMBLE FORMATS 0 TO 4

| PRACH configuration Index | Preamble Format | Density Per 10 ms $D_{RA}$ | Version $r_{RA}$ |
| --- | --- | --- | --- |
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 4 | 0 |
| 13 | 0 | 4 | 1 |
| 14 | 0 | 4 | 2 |
| 15 | 0 | 5 | 0 |
| 16 | 0 | 5 | 1 |
| 17 | 0 | 5 | 2 |
| 18 | 0 | 6 | 0 |
| 19 | 0 | 6 | 1 |
| 20 | 1 | 0.5 | 0 |
| 21 | 1 | 0.5 | 1 |
| 22 | 1 | 0.5 | 2 |
| 23 | 1 | 1 | 0 |
| 24 | 1 | 1 | 1 |
| 25 | 1 | 2 | 0 |
| 26 | 1 | 3 | 0 |
| 27 | 1 | 4 | 0 |
| 28 | 1 | 5 | 0 |
| 29 | 1 | 6 | 0 |
| 30 | 2 | 0.5 | 0 |
| 31 | 2 | 0.5 | 1 |
| 32 | 2 | 0.5 | 2 |
| 33 | 2 | 1 | 0 |
| 34 | 2 | 1 | 1 |
| 35 | 2 | 2 | 0 |

TABLE 3-continued

FRAME STRUCTURE TYPE 2 RANDOM ACCESS
CONFIGURATIONS FOR PREAMBLE FORMATS 0 TO 4

| PRACH configuration Index | Preamble Format | Density Per 10 ms $D_{RA}$ | Version $r_{RA}$ |
|---|---|---|---|
| 36 | 2 | 3 | 0 |
| 37 | 2 | 4 | 0 |
| 38 | 2 | 5 | 0 |
| 39 | 2 | 6 | 0 |
| 40 | 3 | 0.5 | 0 |
| 41 | 3 | 0.5 | 1 |
| 42 | 3 | 0.5 | 2 |
| 43 | 3 | 1 | 0 |
| 44 | 3 | 1 | 1 |
| 45 | 3 | 2 | 0 |
| 46 | 3 | 3 | 0 |
| 47 | 3 | 4 | 0 |
| 48 | 4 | 0.5 | 0 |
| 49 | 4 | 0.5 | 1 |
| 50 | 4 | 0.5 | 2 |
| 51 | 4 | 1 | 0 |
| 52 | 4 | 1 | 1 |
| 53 | 4 | 2 | 0 |
| 54 | 4 | 3 | 0 |
| 55 | 4 | 4 | 0 |
| 56 | 4 | 5 | 0 |
| 57 | 4 | 6 | 0 |
| 58 | N/A | N/A | N/A |
| 59 | N/A | N/A | N/A |
| 60 | N/A | N/A | N/A |
| 61 | N/A | N/A | N/A |
| 62 | N/A | N/A | N/A |
| 63 | N/A | N/A | N/A |

In one embodiment a new PRCH configuration index with a large preamble interval may be implemented. For example, the PRACH configuration index in Table 4 and Table 5 with bolded text may be implemented.

TABLE 4

FRAME STRUCTURE TYPE 1 RANDOM ACCESS
CONFIGURATION FOR PREAMBLE FORMATS 0-3

| PRACH Configuration Index | Preamble Format | System frame number | Subframe number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, 5, 6, 7, 8, 9 |
| 15 | 0 | Even | 9 |
| 16 | 1 | Even | 1 |
| 17 | 1 | Even | 4 |
| 18 | 1 | Even | 7 |
| 19 | 1 | Any | 1 |
| 20 | 1 | Any | 4 |
| 21 | 1 | Any | 7 |
| 22 | 1 | Any | 1, 6 |
| 23 | 1 | Any | 2, 7 |
| 24 | 1 | Any | 3, 8 |
| 25 | 1 | Any | 1, 4, 7 |
| 26 | 1 | Any | 2, 5, 8 |
| 27 | 1 | Any | 3, 6, 9 |
| 28 | 1 | Any | 0, 2, 4, 6, 8 |
| 29 | 1 | Any | 1, 3, 5, 7, 9 |
| 30 | N/A | N/A | N/A |
| 31 | 1 | Even | 9 |
| 32 | 2 | Even | 1 |
| 33 | 2 | Even | 4 |
| 34 | 2 | Even | 7 |
| 35 | 2 | Any | 1 |
| 36 | 2 | Any | 4 |
| 37 | 2 | Any | 7 |
| 38 | 2 | Any | 1, 6 |
| 39 | 2 | Any | 2, 7 |
| 40 | 2 | Any | 3, 8 |
| 41 | 2 | Any | 1, 4, 7 |
| 42 | 2 | Any | 2, 5, 8 |
| 43 | 2 | Any | 3, 6, 9 |
| 44 | 2 | Any | 0, 2, 4, 6, 8 |
| 45 | 2 | Any | 1, 3, 5, 7, 9 |
| 46 | N/A | N/A | N/A |
| 47 | 2 | Even | 9 |
| 48 | 3 | Even | 1 |
| 49 | 3 | Even | 4 |
| 50 | 3 | Even | 7 |
| 51 | 3 | Any | 1 |
| 52 | 3 | Any | 4 |
| 53 | 3 | Any | 7 |
| 54 | 3 | Any | 1, 6 |
| 55 | 3 | Any | 2, 7 |
| 56 | 3 | Any | 3, 8 |
| 57 | 3 | Any | 1, 4, 7 |
| 58 | 3 | Any | 2, 5, 8 |
| 59 | 3 | Any | 3, 6, 9 |
| 60 | N/A | N/A | N/A |
| 61 | N/A | N/A | N/A |
| 62 | N/A | N/A | N/A |
| 63 | 3 | Even | 9 |

Supplement for Frame structure type 1 random access configuration for preamble formats

| 64 | 0 | Every 4 | 1 |
| 65 | 1 | Every 4 | 1 |
| 66 | 0 | Every 8 | 1 |
| 67 | 1 | Every 8 | 1 |
| 68 | 0 | Every 16 | 1 |
| 69 | 1 | Every 16 | 1 |
| ... | | | |

TABLE 5

FRAME STRUCTURE TYPE 2 RANDOM ACCESS
CONFIGURATIONS FOR PREAMBLE FORMATS 0-4

| PRACH configuration Index | Preamble Format | Density Per 10 ms $D_{RA}$ | Version $r_{RA}$ |
|---|---|---|---|
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 4 | 0 |

TABLE 5-continued

FRAME STRUCTURE TYPE 2 RANDOM ACCESS
CONFIGURATIONS FOR PREAMBLE FORMATS 0-4

| PRACH configuration Index | Preamble Format | Density Per 10 ms $D_{RA}$ | Version $r_{RA}$ |
|---|---|---|---|
| 13 | 0 | 4 | 1 |
| 14 | 0 | 4 | 2 |
| 15 | 0 | 5 | 0 |
| 16 | 0 | 5 | 1 |
| 17 | 0 | 5 | 2 |
| 18 | 0 | 6 | 0 |
| 19 | 0 | 6 | 1 |
| 20 | 1 | 0.5 | 0 |
| 21 | 1 | 0.5 | 1 |
| 22 | 1 | 0.5 | 2 |
| 23 | 1 | 1 | 0 |
| 24 | 1 | 1 | 1 |
| 25 | 1 | 2 | 0 |
| 26 | 1 | 3 | 0 |
| 27 | 1 | 4 | 0 |
| 28 | 1 | 5 | 0 |
| 29 | 1 | 6 | 0 |
| 30 | 2 | 0.5 | 0 |
| 31 | 2 | 0.5 | 1 |
| 32 | 2 | 0.5 | 2 |
| 33 | 2 | 1 | 0 |
| 34 | 2 | 1 | 1 |
| 35 | 2 | 2 | 0 |
| 36 | 2 | 3 | 0 |
| 37 | 2 | 4 | 0 |
| 38 | 2 | 5 | 0 |
| 39 | 2 | 6 | 0 |
| 40 | 3 | 0.5 | 0 |
| 41 | 3 | 0.5 | 1 |
| 42 | 3 | 0.5 | 2 |
| 43 | 3 | 1 | 0 |
| 44 | 3 | 1 | 1 |
| 45 | 3 | 2 | 0 |
| 46 | 3 | 3 | 0 |
| 47 | 3 | 4 | 0 |
| 48 | 4 | 0.5 | 0 |
| 49 | 4 | 0.5 | 1 |
| 50 | 4 | 0.5 | 2 |
| 51 | 4 | 1 | 0 |
| 52 | 4 | 1 | 1 |
| 53 | 4 | 2 | 0 |
| 54 | 4 | 3 | 0 |
| 55 | 4 | 4 | 0 |
| 56 | 4 | 5 | 0 |
| 57 | 4 | 6 | 0 |
| 58 | N/A | N/A | N/A |
| 59 | N/A | N/A | N/A |
| 60 | N/A | N/A | N/A |
| 61 | N/A | N/A | N/A |
| 62 | N/A | N/A | N/A |
| 63 | N/A | N/A | N/A |

Supplement for Frame structure type 2 random access configurations for preamble formats

| 58 | 0 | 0.1 | 0 |
| 59 | 1 | 0.1 | 0 |
| 60 | 2 | 0.1 | 0 |
| 61 | 3 | 0.1 | 0 |
| 62 | 4 | 0.1 | 0 |
| 63 | 0 | 0.05 | 0 |
| 64 | 1 | 0.05 | 0 |
| 65 | 2 | 0.05 | 0 |
| 66 | 3 | 0.05 | 0 |
| 67 | 4 | 0.05 | 0 |
| ... | | | |

Figure 18:
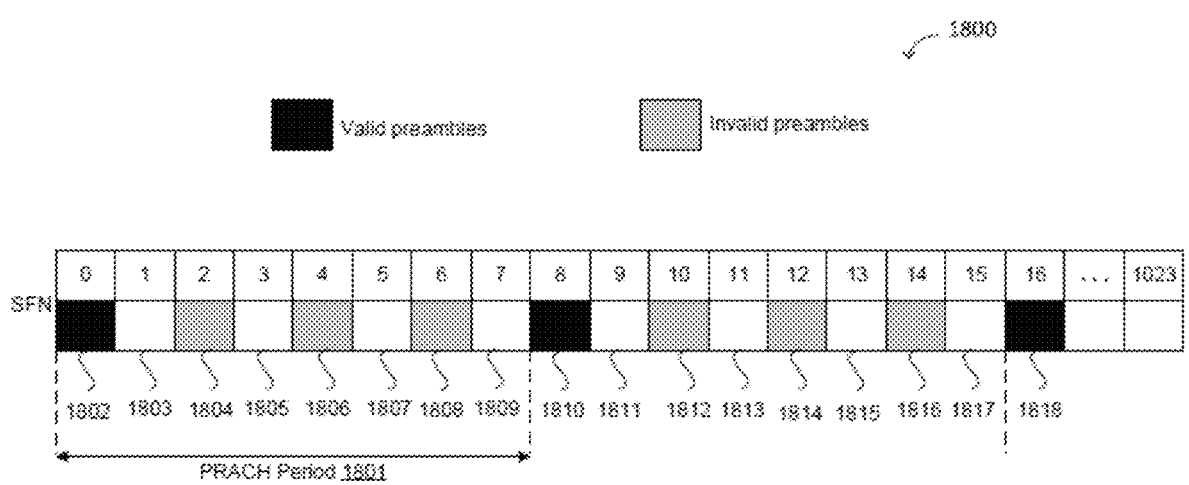
FIG. 18 illustrates a block diagram of an example PRACH period configured by SIB, according to some embodiments of the present disclosure.

FIG. 18 illustrates a block diagram of an example PRACH period configured 1800 by SIB, according to some embodiments of the present disclosure. SIB may explicitly configure the PRACH period. While PRACH configuration indices can indicate a plurality of preamble occasions, only the first preamble occasion within one period may be valid. In one example, the PRACH period 1801 may be 80 ms. Although every SFN has a preamble (1802 to 1818), only the preamble in the first SFN within the PRACH period may be valid. Thus, preambles associated with SFN0 (1802), SFN8 (1810) and SFN16 (1818) may be valid.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module", or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method, comprising:
   sending, by a wireless communication node to a wireless communication device, a Physical Random Access Channel (PRACH) parameter configuration, wherein the PRACH parameter configuration indicates mapping between a plurality of PRACH resources and a plurality of cell beams, wherein the mapping indicates that each of the plurality of cell beams corresponds to a respective one of a plurality of beam offsets that are included in one PRACH period; and
   receiving, by the wireless communication node from the wireless communication device, a preamble.

2. The wireless communication method of claim 1, wherein the mapping indicates the plurality of cell beams of a cell as a cell beam list, and each of the plurality of cell beams corresponds to a respective one of the plurality of PRACH resources.

3. The wireless communication method of claim 1, wherein PRACH comprises at least one of Narrow Band-Internet of Things Narrowband Physical Random Access Channel (NPRACH) and Enhanced Machine-Type Communication Physical Random Access Channel (PRACH).

4. The wireless communication method of claim 1, wherein the mapping indicates the plurality of PRACH resources as a PRACH resources list, and each of the plurality of PRACH resources corresponds to a respective one of the plurality of cell beams, which are included in a cell.

5. The wireless communication method of claim 1, wherein the mapping indicates that each of the plurality of PRACH resources corresponds to a respective one of a plurality of carriers of a cell.

6. The wireless communication method of claim 1, wherein the mapping indicates that each of the plurality of cell beams corresponds to a respective one of the plurality of PRACH resources that is within one PRACH period.

7. The wireless communication method of claim 1, wherein the mapping indicates that each of the plurality of cell beams corresponds to one of a plurality of frequency-domain PRACH resources within a PRACH period.

8. The wireless communication method of claim 1, wherein the mapping indicates that each of the plurality of cell beams corresponds to at least one of: one of a plurality of frequency-domain PRACH resources or one of a plurality of time domain PRACH resources.

9. The wireless communication method of claim 1, wherein the mapping indicates that each of the plurality of cell beams corresponds to a predefined number of a plurality of frequency-domain PRACH resources that are continuous in a frequency-domain and within one PRACH period in a time-domain.

10. The wireless communication method of claim 9, wherein the predefined number of frequency-domain PRACH resources corresponding to a first one of the plurality of cell beams and the predefined number of frequency-domain PRACH resources corresponding to a second one of the plurality of cell beams are continuous in the frequency-domain.

11. The wireless communication method of claim 9, wherein the mapping further indicates a number of cell beams per Random Access Channel (RACH) occasion.

12. The wireless communication method of claim 1, wherein a predefined number of frequency-domain PRACH resources corresponding to a first one of the plurality of cell beams and a predefined number of frequency-domain PRACH resources corresponding to a second one of the plurality of cell beams are not continuous in a frequency-domain.

13. A wireless communication node comprising:
at least one processor configured to:
send, via a transceiver to a wireless communication device, a Physical Random Access Channel (PRACH) parameter configuration, wherein the PRACH parameter configuration indicates mapping between a plurality of PRACH resources and a plurality of cell beams, wherein the mapping indicates that each of the plurality of cell beams corresponds to a respective one of a plurality of beam offsets that are included in one PRACH period; and
receive, via the transceiver from the wireless communication device, a preamble.

14. The wireless communication node of claim 13, wherein the mapping indicates the plurality of cell beams of a cell as a cell beam list, and each of the plurality of cell beams corresponds to a respective one of the plurality of PRACH resources.

15. The wireless communication node of claim 13, wherein PRACH comprises at least one of Narrow Band-Internet of Things Narrowband Physical Random Access Channel (NPRACH) and Enhanced Machine-Type Communication Physical Random Access Channel (PRACH).

16. The wireless communication node of claim 13, wherein the mapping indicates the plurality of PRACH resources as a PRACH resources list, and each of the plurality of PRACH resources corresponds to a respective one of the plurality of cell beams, which are included in a cell.

17. The wireless communication node of claim 13, wherein the mapping indicates that each of the plurality of PRACH resources corresponds to a respective one of a plurality of carriers of a cell.

18. The wireless communication node of claim 13, wherein the mapping indicates that each of the plurality of cell beams corresponds to a respective one of the plurality of PRACH resources that is within one PRACH period.

* * * * *